UNITED STATES PATENT OFFICE.

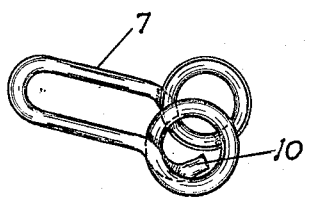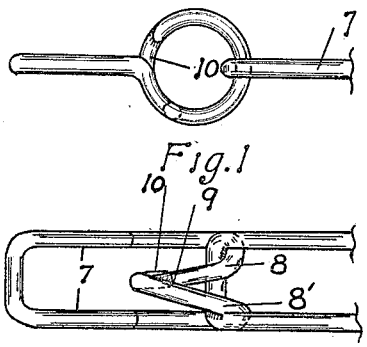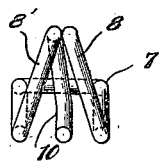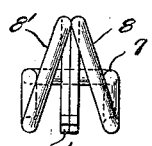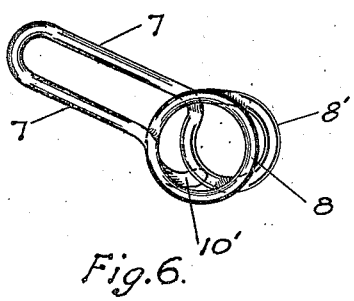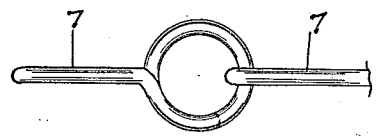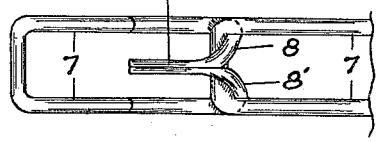

ERICH W. O. STEUDEL, OF CHICAGO, ILLINOIS.

CHAIN LINK.

1,423,273. Specification of Letters Patent. Patented July 18, 1922.

Application filed March 3, 1920. Serial No. 364,282.

*To all whom it may concern:*

Be it known that I, ERICH W. O. STEUDEL, a citizen of the United States, and a resident of the city of Chicago, county of Cook, and State of Illinois, have invented certain new and useful Improvements in Chain Links, of which the following is a specification.

My invention relates to improvements in chain links, and has for its object an improved detachable chain link which is of simple construction, efficient in operation and capable of economical manufacture.

Other objects will appear hereinafter.

The invention consists in the combinations and arrangements of parts hereinafter described and claimed.

The invention will be best understood by reference to the accompanying drawings forming a part of this specification, and in which, Fig. 1, is a side view of a complete link and a portion of another, embodying the invention, Fig. 2, a top plan view corresponding with Fig. 1, Fig. 3, a perspective view of one of the links detached, Fig. 3ª is an end elevation of the link shown in Fig. 3;

Fig. 4, a view similar to Fig. 1, but showing a slightly modified form of construction, Fig. 5, a top plan view corresponding with Fig. 4, and Fig. 6, a perspective view illustrating the form of link illustrated in Figs. 4 and 5.

Fig. 6ª is an end elevation of the link shown in Fig. 6.

The form of construction illustrated in Figs. 1, 2 and 3, comprises a chain link made of a single piece of wire bent into loop form to constitute the loop 7 of a chain link, the ends 8 and 8' of said loop being bent, as indicated, to form an eye converging inwardly toward each other, as shown. The end 8 is brought to abutting position against the side of the end 8' at 9, and the end 8' continued to form the hook portion 10, as shown. By this arrangement the loop 7 of an adjoining link may be turned sideways and passed through the loop 7 along the side of the hook 10, and then turned to pass over said hook, thus uniting the two in chain form mesh, and the hook 10 preventing retrograde disengagement. The chain links thus constructed may be economically manufactured, and are highly efficient in use.

The form of construction illustrated in Figs. 4, 5 and 6 is identical with that already described, except that the ends 8 and 8' are split in half and adjoin each other along the line 9', and both are continued throughout the extent of the hook 10'.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claim.

Having described my invention, what I claim as new and desire to secure by Letters Patent is:—

A detachable chain link formed of a single piece of wire bent into loop form, the ends of said link being correspondingly bent to form substantially circular eyes and converged inwardly toward each other to prevent lateral play of a related hook and brought together and formed into a hook having a curvature in substantial continuation of that of said eyes, to prevent accidental detachment of said link.

In testimony whereof I have signed my name to this specification in the presence of two subscribing witnesses.

ERICH W. O. STEUDEL.

Witnesses:
ROSE K. TRIB,
B. G. RICHARDS.